(12) United States Patent
Xiao et al.

(10) Patent No.: US 8,611,300 B2
(45) Date of Patent: Dec. 17, 2013

(54) METHOD AND APPARATUS FOR CONVEYING CONTROL CHANNEL INFORMATION IN OFDMA SYSTEM

(75) Inventors: Weimin Xiao, Hoffman Estates, IL (US); Amitava Ghosh, Buffalo Grove, IL (US); Rapeepat Ratasuk, Hoffman Estates, IL (US); Brian K. Classon, Palatine, IL (US); Kevin L. Baum, Rolling Meadows, IL (US); Robert T. Love, Barrington, IL (US)

(73) Assignee: Motorola Mobility LLC, Libertyville, IL (US)

( * ) Notice: Subject to any disclaimer, the term of this patent is extended or adjusted under 35 U.S.C. 154(b) by 363 days.

(21) Appl. No.: 11/623,373

(22) Filed: Jan. 16, 2007

(65) Prior Publication Data

US 2007/0165731 A1 Jul. 19, 2007

Related U.S. Application Data

(60) Provisional application No. 60/759,706, filed on Jan. 18, 2006.

(51) Int. Cl.
*H04W 4/00* (2009.01)

(52) U.S. Cl.
USPC .......................................................... 370/330

(58) Field of Classification Search
USPC ........................... 370/206–210, 281, 295, 330
See application file for complete search history.

(56) References Cited

U.S. PATENT DOCUMENTS

| 4,491,947 A | 1/1985 | Frank |
| 6,031,826 A | 2/2000 | Hassan |
| 6,097,772 A | 8/2000 | Johnson et al. |
| 6,243,580 B1 | 6/2001 | Garner |
| 6,347,391 B1 | 2/2002 | Uesugi et al. |
| 6,504,830 B1 | 1/2003 | Oesterg et al. |
| 6,549,772 B1 | 4/2003 | Chavez et al. |
| 6,574,211 B2 | 6/2003 | Padovani et al. |
| 6,697,422 B1 | 2/2004 | Mathai |

(Continued)

FOREIGN PATENT DOCUMENTS

| EP | 1300978 B1 | 7/2004 |
| EP | 1351538 B1 | 10/2004 |

(Continued)

OTHER PUBLICATIONS

3GPP TSG-RAN WG1 Meeting #42, Control Signalling Considerations for E-UTRA Downlink, R1-050814, London, UK, Aug. 29-Sep. 2, 2005, Nokia pp. 1-3.

(Continued)

*Primary Examiner* — Mark Rinehart
*Assistant Examiner* — Peter Cheng

(57) ABSTRACT

Various embodiments are described which can serve to mitigate interference between the control channel signaling of adjacent sectors/cells. Potentially, these techniques may have the benefit of reducing the system resource drain caused by control channels, particularly control channels in high frequency-reuse, OFDMA systems. A transmitting device (101) transmits primary control channel information to a plurality of user devices (102). The primary control channel information includes an indication that a first OFDMA resource region (e.g., 320 or 330) is assigned to at least one user device of the plurality of user devices. The transmitting device correspondingly transmits secondary control channel information to the at least one user device using the first OFDMA resource region.

23 Claims, 3 Drawing Sheets

(56) References Cited

U.S. PATENT DOCUMENTS

| | | |
|---|---|---|
| 6,751,187 B2 | 6/2004 | Walton et al. |
| 6,775,320 B1 | 8/2004 | Tzannes et al. |
| 6,934,275 B1 | 8/2005 | Love et al. |
| 7,016,319 B2 | 3/2006 | Baum et al. |
| 7,200,405 B2 | 4/2007 | Rudolf et al. |
| 7,551,937 B2 * | 6/2009 | Kim et al. ............... 455/509 |
| 7,664,091 B2 | 2/2010 | Batariere et al. |
| 7,684,762 B2 * | 3/2010 | Ihm et al. ............... 455/69 |
| 7,778,307 B2 | 8/2010 | Kuchibhotla et al. |
| 2002/0032030 A1 | 3/2002 | Berglund et al. |
| 2002/0077152 A1 * | 6/2002 | Johnson et al. ............... 455/562 |
| 2003/0032030 A1 | 2/2003 | Prolla et al. |
| 2003/0063583 A1 | 4/2003 | Padovani et al. |
| 2004/0057530 A1 | 3/2004 | Tarokh et al. |
| 2004/0082333 A1 | 4/2004 | Ito et al. |
| 2005/0025101 A1 | 2/2005 | Paneth et al. |
| 2005/0037763 A1 | 2/2005 | Hamamoto et al. |
| 2005/0120097 A1 | 6/2005 | Walton et al. |
| 2005/0147078 A1 | 7/2005 | Arima et al. |
| 2005/0201325 A1 * | 9/2005 | Kang et al. ............... 370/328 |
| 2005/0243774 A1 | 11/2005 | Choi et al. |
| 2005/0254442 A1 | 11/2005 | Proctor, Jr. et al. |
| 2006/0007887 A1 | 1/2006 | Kwon et al. |
| 2006/0018347 A1 | 1/2006 | Agrawal |
| 2006/0050742 A1 | 3/2006 | Grandhi et al. |
| 2006/0072520 A1 | 4/2006 | Chitrapu et al. |
| 2006/0101168 A1 * | 5/2006 | Roh et al. ............... 710/33 |
| 2006/0133262 A1 * | 6/2006 | Sutivong et al. ............... 370/209 |
| 2007/0025468 A1 | 2/2007 | Li |
| 2007/0047474 A1 | 3/2007 | Anderson |
| 2007/0076677 A1 | 4/2007 | Batariere et al. |
| 2007/0110104 A1 | 5/2007 | Sartori et al. |
| 2007/0121543 A1 | 5/2007 | Kuchibhotla et al. |
| 2007/0121567 A1 * | 5/2007 | Venkatachalam et al. .... 370/343 |
| 2007/0165731 A1 | 7/2007 | Xiao et al. |
| 2007/0206686 A1 | 9/2007 | Vook et al. |
| 2008/0040105 A1 | 2/2008 | Wang et al. |
| 2008/0062912 A1 | 3/2008 | Tiedemann, Jr. et al. |
| 2008/0084853 A1 | 4/2008 | Kuchibhotla et al. |
| 2008/0187136 A1 * | 8/2008 | Zhang et al. ............... 380/270 |
| 2008/0232291 A1 | 9/2008 | Hus et al. |

FOREIGN PATENT DOCUMENTS

| | | |
|---|---|---|
| JP | 2008507896 A | 3/2008 |
| KR | 20050009663 A | 1/2005 |
| WO | 03001702 A1 | 1/2003 |
| WO | 2005008360 A2 | 1/2005 |
| WO | 2005032014 A1 | 4/2005 |
| WO | 2005050875 A1 | 6/2005 |
| WO | 2005104461 A1 | 11/2005 |

OTHER PUBLICATIONS

Supplementary European Search Report, European Patent Office, The Hague, Dec. 19, 2012, all pages.

Japanese Patent Office, Decision of Rejection for Japanese Patent Application No. 2008-551521 dated Oct. 25, 2011, 2 pages.

Scalable OFDMA Physical Layer in IEEE 802.16 Wirelessman; Intel Technology Journal; Aug. 20, 2004; 14 pages.

3GPP2 X.S0022-A Version 0.3 Broadcast and Multicast Service in CDMA2000 Wireless IP Network; Revision A, Sep. 3, 2013.

3GPP TSG RAN 1 #44, R1-060378 "E-UTRA Downlink Control Channel Structure and TP" Motorola, Denver, USA, Feb. 13-17, 2006, 7 pages.

3GPP TSG RAN WG1 Ad Hoc on LTE, R1-050590 "Physical Channels and Multiplexing in Evolved UTRA Downlink" Sophia Antipolis, France, Jun. 20-21, 2005, 24 pages.

* cited by examiner

METHOD AND APPARATUS FOR CONVEYING CONTROL CHANNEL INFORMATION IN OFDMA SYSTEM

REFERENCE(S) TO RELATED APPLICATION(S)

The present application claims priority from provisional application Ser. No. 60/759,706, entitled "METHOD AND APPARATUS FOR CONVEYING CONTROL CHANNEL INFORMATION," filed Jan. 18, 2006, which is commonly owned and incorporated herein by reference in its entirety.

FIELD OF THE INVENTION

The present invention relates generally to communications and, in particular, to conveying control channel information in OFDMA (orthogonal frequency division multiple access) systems.

BACKGROUND OF THE INVENTION

Currently, standards bodies such as 3GPP (3rd Generation Partnership Project) are developing standards specifications for E-UTRA (Evolved UMTS Terrestrial Radio Access) systems. (3GPP may be contacted via http://www.3gpp.org/.) At present, OFDMA is a strong candidate for 3GPP Evolution downlink technology, and a frequency reuse factor of '1' is being considered. However, with such a frequency reuse plan, a control channel in one sector or cell may experience interference from various channels in other sectors or cells. This could result in significant performance degradation at sector/cell edges. To achieve the necessary level of reliability, the common control channels of such high reuse systems are expected to consume a relatively large amount of the systems' limited bandwidth and power. Accordingly, it would be desirable to have an improved method and apparatus for conveying control channel information, which could reduce the drain on system resources, particularly for high-reuse OFDMA systems.

Specific embodiments of the present invention are disclosed below with reference to FIGS. 1-4. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, unless specifically indicated, the order and grouping of signaling is not a limitation of other embodiments that may lie within the scope of the claims Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments are described which can serve to mitigate interference between the control channel signaling of adjacent sectors/cells. Potentially, these techniques may have the benefit of reducing the system resource drain caused by control channels, particularly control channels in high frequency-reuse, OFDMA systems. A transmitting device transmits primary control channel information to a plurality of user devices. The primary control channel information includes an indication that a first OFDMA resource region is assigned to at least one user device of the plurality of user devices. The transmitting device correspondingly transmits secondary control channel information to the at least one user device using the first OFDMA resource region.

Figure 1:
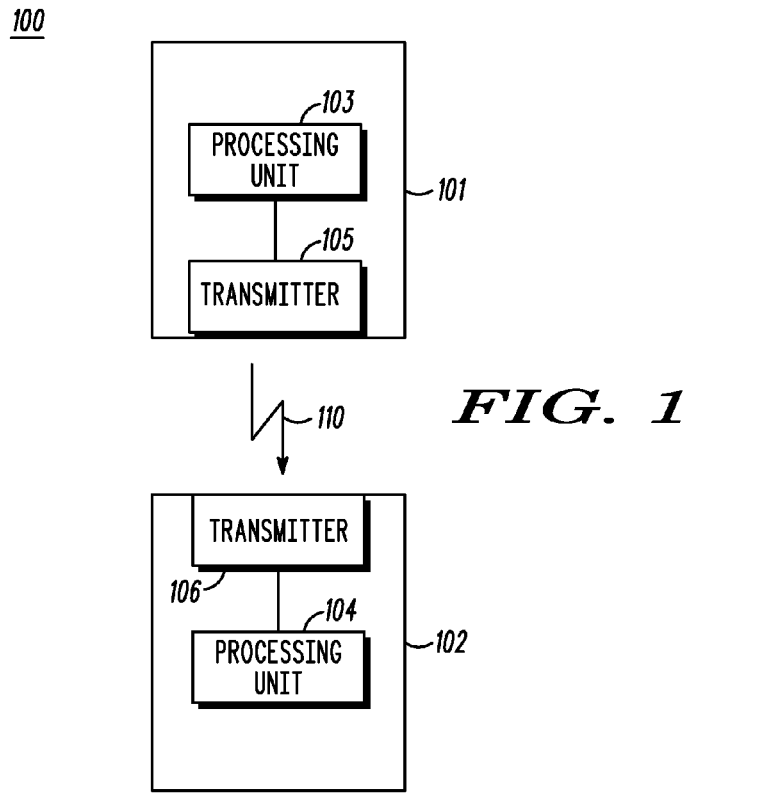
FIG. 1 is a block diagram depiction of a wireless communication system in accordance with multiple embodiments of the present invention.
Figure 2:
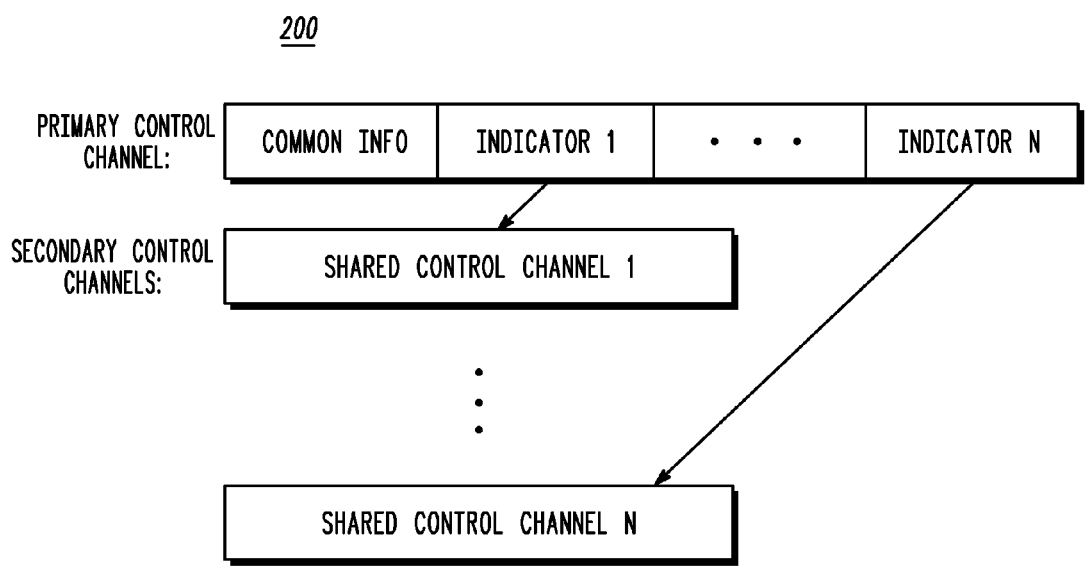
FIG. 2 is a block diagram depiction of the relationship between a primary control channel and a secondary control channel in accordance with multiple embodiments of the present invention.

The disclosed embodiments can be more fully understood with reference to FIGS. 1-4. FIG. 1 is a block diagram depiction of a wireless communication system 100 in accordance with multiple embodiments of the present invention. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for wireless telecommunications systems. (These groups may be contacted via http://www.openmobilealliance.com, http://www.3gpp.org/, http://www.3gpp2.com/ and http://www.ieee802.org/, respectively.) Communication system 100 represents a system having an architecture in accordance with one or more of the 3GPP technologies (such as the emerging E-UTRA technologies), suitably modified to implement the present invention. Alternative embodiments of the present invention may be implemented in communication systems that employ other or additional technologies such as, but not limited to, those described in the 3GPP2 specification and/or those described in the IEEE's 802.xx specifications.

Communication system 100 is depicted in a very generalized manner. In particular, communication devices 101 and 102 are shown communicating via downlink 110. Device 101 is a transmitting device, while device 102 a receiving device. Depending on the embodiment, device 101 may represent a portion of a radio access network (RAN), while device 102 may represent a UE (user equipment) device. Those skilled in the art will recognize that FIG. 1 does not depict all of the physical fixed network components that may be necessary for system 100 to operate but only those system components and logical entities particularly relevant to the description of embodiments herein.

For example, FIG. 1 depicts device 101 as comprising processing unit 103 and transmitter 105 and depicts device 102 as comprising processing unit 104 and receiver 106. In general, components such as processing units, transmitters and receivers are well-known. For example, processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given a high-level description, an algorithm, a logic flow, a messaging/signaling flow, and/or a protocol specification, those skilled in the art are aware of the many design and development techniques available to implement a processing unit that performs the given logic. Therefore, devices 101 and 102 represent known devices that have been adapted, in accordance with the description herein, to implement multiple embodiments of the present invention. Furthermore, those skilled in the art will recognize that aspects of the present invention may be implemented in and across various physical components and none are necessarily limited to single platform implementations. For example, device 101 may be implemented in or across one or more RAN components, such as a base transceiver station (BTS) and/or a base station controller (BSC). Also, regarding UEs, UE platforms are known to refer to a wide variety of consumer electronic platforms such as, but not limited to, access terminals (ATs), mobile stations (MSs), terminal equipment, mobile devices, gaming devices, personal computers, personal digital assistants (PDAs), cable set-top boxes and satellite set-top boxes.

In addition, those skilled in the art will recognize that downlink 110 of FIG. 1 does not necessarily depict all of the signaling that may be necessary for system 100 to fully operate. For example, depending on the embodiment, the air interface between devices 101 and 102 may comprise both uplink and downlink signaling and, more specifically, may comprise traffic channels, which are dynamically assigned and de-assigned to support user services, and a variety of well-known non-traffic channel types, such as broadcast channels, paging channels, access channels and/or common control channels, all in accordance with the particular 3GPP signaling technology used.

Operation of embodiments in accordance with the present invention occurs substantially as follows. Processing unit 103 of device 101 assigns a first OFDMA resource region to one or more user devices. To simplify the description, it will be assumed that the first OFDMA resource region is assigned to user device 102; however, other user devices in addition to device 102 or instead of device 102 may be the target of the OFDMA resource assignment. For example, the first OFDMA resource region could be assigned to a group of user devices participating in the same communication session (e.g., group call, broadcast, game, etc.).

Using transmitter 105, processing unit 103 then transmits primary control channel information via downlink 110. In many embodiments, the primary control channel information is effectively transmitted as common control channel information, which is intended for all listening user devices within the coverage area of transmitter 105. The primary control channel information includes an indication that the first OFDMA resource region is assigned to the one or more user devices. The first OFDMA resource region is used by processing unit 103 to correspondingly transmit secondary control channel information to the one or more user devices. Processing unit 104 of user device 102 receives via receiver 106 the primary control channel information, which includes the indication of the OFDMA resource region assignment to device 102, and in response receives the secondary control channel information in the assigned region.

In effect, device 101 is transmitting both a primary control channel and one or more secondary control channels. To provide an example, the relationship between a primary control channel and its secondary control channel(s) is depicted by logical block diagram 200 in FIG. 2. In this example, primary control channel information includes information required by the user devices to both locate and decode at least part of their respectively assigned secondary control channels. For example, primary control channel information may include common information that enables listening user devices to decode the secondary control channels, or the common information may include only the decoding-related information applicable to all the secondary control channels. Each secondary control channel may then provide supplemental information for decoding the additional information conveyed via that channel (a data portion, e.g.). (See OFDMA region 320 for example.)

In this example, the primary control channel information would also include, in addition to any common information, some indicator of the OFDMA resource regions which the secondary control channels will occupy. In general, an OFDMA resource region represents a group of frequency sub-carriers for some number of OFDMA symbol periods. An indicator of a particular OFDMA resource region would thus convey the bounds of that region by some easily derived technique or convention.

Depending on the embodiment, the information conveyed via the secondary control channels can take a variety of forms. Different embodiments may seek to minimize to different degrees the amount of information conveyed to all the listening user devices verses that sent via the more targeted secondary control channels. Thus, what information may be sent via the primary control channel verses the secondary control channels can vary substantially from embodiment to embodiment. The secondary control channel information may include either data or control information, or both, for the user devices to which the OFDMA resource region is assigned. (See OFDMA regions 320, 330 and 420 for example.) Also, the secondary control channel information may pertain to uplink or downlink operation. Some more specific examples of the types of information that may or may not be conveyed as secondary control channel information include, but are not limited to the following: an OFDMA resource region assignment, an indication of whether the OFDMA resource region assignment is distributed or localized, smart antenna information, a modulation specifier, an HARQ (hybrid automatic retransmission request) redundancy version and new data indicator, power control information, scheduling information, and timing advance information.

Figure 3:
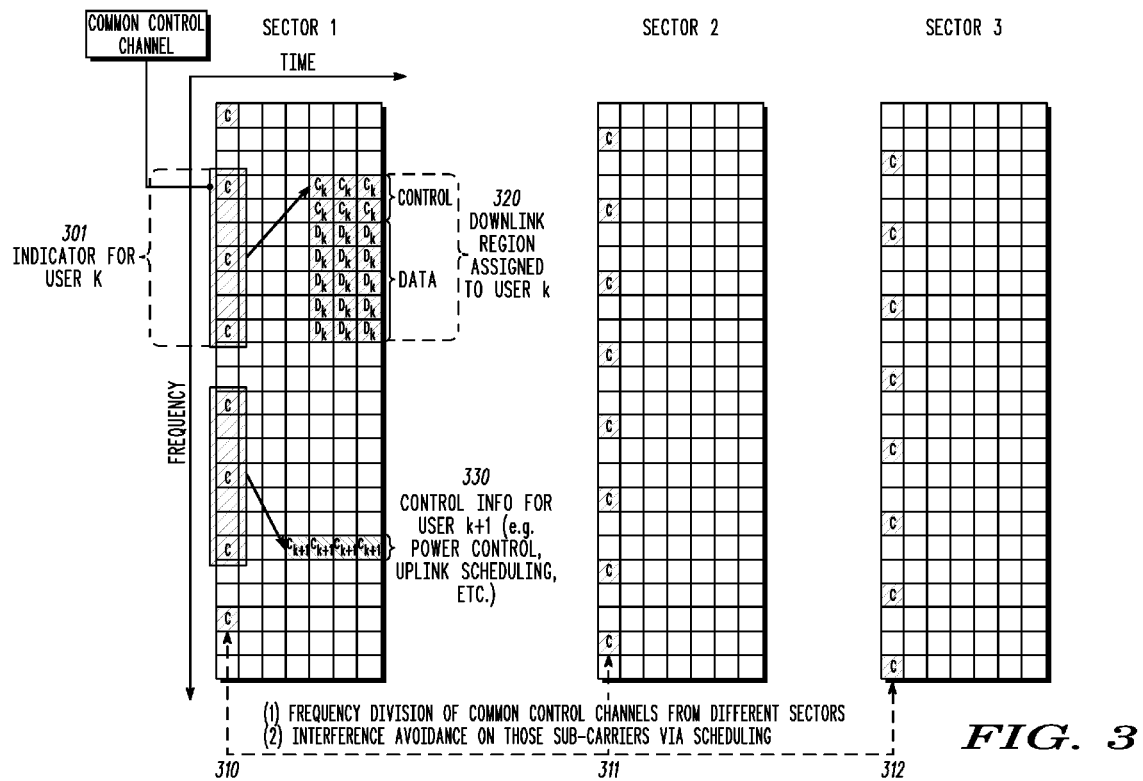
FIG. 3 is a block diagram depiction of an OFDMA resource region map showing an example configuration of control channels in accordance with a first group of embodiments of the present invention.
Figure 4:
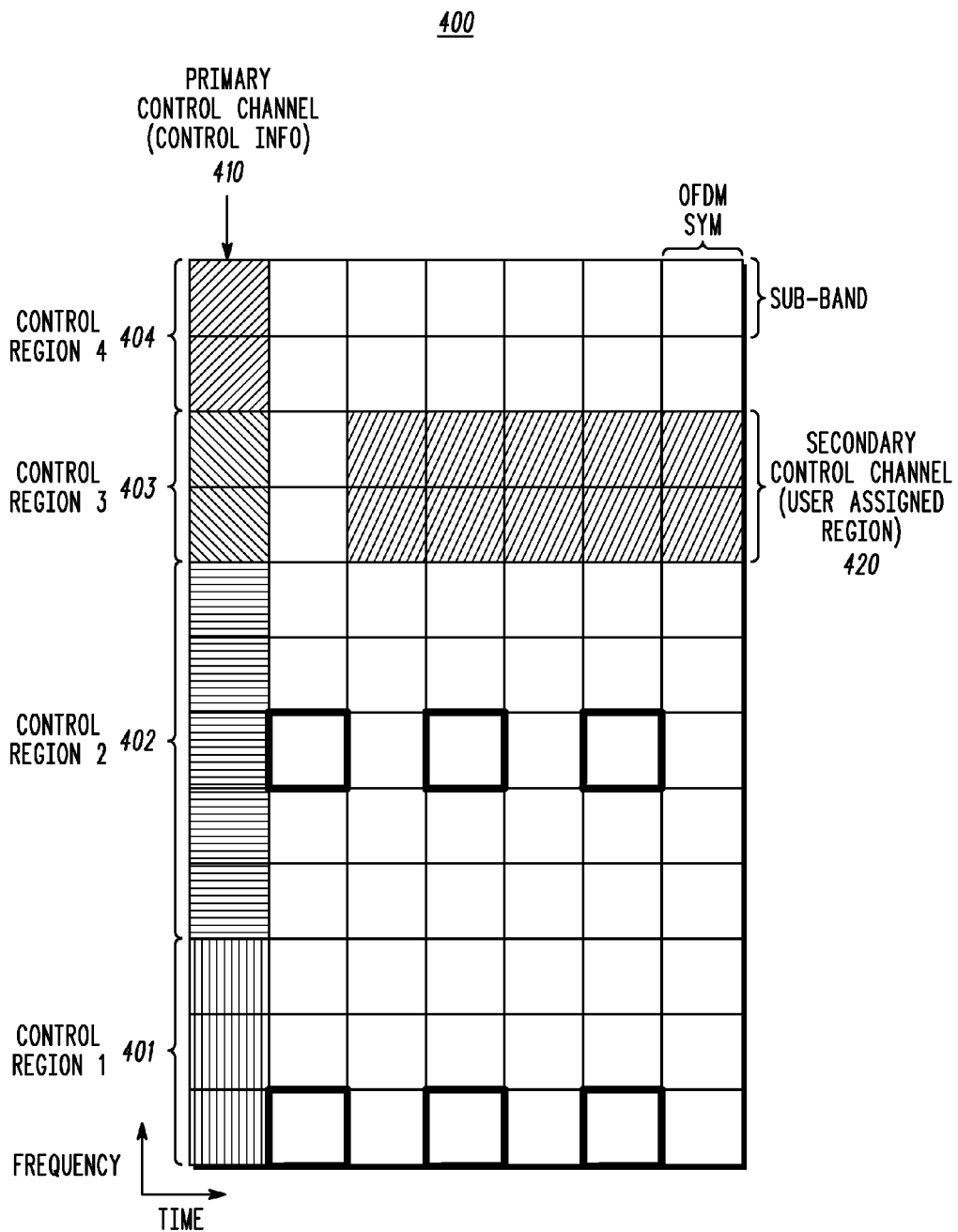
FIG. 4 is a block diagram depiction of an OFDMA resource region map showing an example configuration of control channels in accordance with a second group of embodiments of the present invention.

FIGS. 3 and 4 are block diagram depictions of OFDMA resource region maps showing example configurations of control channels. Each is in accordance with different, although overlapping, groups of embodiments. Primary control channel information is transmitted via OFDMA control regions. Similar to OFDMA resource regions, an OFDMA control region represents one or more frequency sub-carriers for some number of OFDMA symbol periods. Thus, individual OFDMA control regions may represent a different set of frequency sub-carriers and/or a different set of OFDM symbols. Many different OFDMA control region arrangements are therefore are possible. Block diagrams 300 and 400 illustrate a few examples but are by no means comprehensive in illustrating all the possibilities.

In diagram 400, for example, control regions 401-404 are illustrated as part of primary control channel 410. However, each control region could instead be viewed as individual primary control channels. In some embodiments, control regions 401-404 may each utilize different modulation and coding rates, i.e., each would be different Adaptive Modulation and Coding (AMC) control region. Further details for such an approach may be gleaned from the pending US patent application entitled, "Method and Apparatus for Control Channel Transmission and Reception," having Ser. No. 11/242,254, filed Oct. 3, 2005.

Alternatively (or perhaps in addition to some of the embodiments depicted in diagram 400), diagram 300 illustrates that the control regions may be frequency division multiplexed across the sectors of a sectored cell (or across other adjacent coverage areas, cell-to-cell, sector-to-cell, etc.). Thus, the control regions of each of primary control channels 310-312 are non-overlapping in frequency. Such a configuration can reduce the interference between the primary control channels 310-312 as well as provide some new opportunities for reusing OFDMA resources from one coverage area to the next through scheduling. For example, the same OFDMA resource region being used by one transmitter as a control region, can be used by a transmitter in an adjacent coverage area for one or more low-power user devices (i.e., requiring downlink transmit power below a certain power threshold). These could be low-power data users, for example.

Similar scheduling techniques may also be used in assigning the OFDMA resource regions for the secondary control channels. For example, the primary control channel information conveyed via control regions 301 indicate that OFDMA resource region 320 is assigned to user device k. Although not depicted in diagram 300, the OFDMA resource region of sector 2 that corresponds to the OFDMA resource region 320 of sector 1 may be assigned to one or more low-power devices (i.e., requiring downlink transmit power below a certain power threshold) in the coverage area of sector 2 (and possibly in the coverage area of sector 3, in addition). This assumes that user device k is not a low-power device at the time. Instead, if user device k is considered a low-power device for the purposes of this transmission, then one or more device that are not considered low-power may be assigned the corresponding resource in either sector 2 or sector 3.

To further improve the performance of both the primary and secondary control channel signaling various other techniques may be employed. For example, the primary control channel information can be transmitted near the beginning of the OFDMA frame, together with the pilots, e.g. Another example is to use a sector-specific scrambling code in generating the transmit signals of any or all of the control channel signaling. Also, some form of transmit diversity may be used when transmitting either or both of the primary and/or secondary control channel information. Types of transmit diversity that may be used include, but are not limited to, STBC (Space-Time Block Code), SFBC (Space-Frequency Block Code) or CSD (cyclic shift diversity).

It is also anticipated that the cell coverage area of the primary and secondary control channel may be improved by using repetition coding. It is believed that the use of repetition coding can achieve high reliability over the cell area under interference limited scenarios.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") are intended to encompass all the various techniques available for communicating or referencing the object being indicated. Some, but not all examples of techniques available for communicating or referencing the object being indicated include the conveyance of the object being indicated, the conveyance of an identifier of the object being indicated, the conveyance of information used to generate the object being indicated, the conveyance of some part or portion of the object being indicated, the conveyance of some derivation of the object being indicated, and the conveyance of some symbol representing the object being indicated. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for conveying control channel information comprising:

assigning, by a processor, a first OFDMA (orthogonal frequency division multiple access) resource region in a secondary downlink control channel to at least one user device of a plurality of user devices when at least one condition is met from the group consisting of:

the first OFDMA resource region has not been assigned to any user devices in coverage areas adjacent to the coverage area of the at least one user device that require a downlink transmit power above a first transmit power threshold, the first OFDMA resource region has been assigned to at least one other user device in at least one coverage area adjacent to the coverage area of the at least one user device but the at least one user device only requires a downlink transmit power below a second transmit power threshold, and the first OFDMA resource region corresponds to an OFDMA control region in at least one coverage area adjacent to the coverage area of the at least one user device but the at least one user device only requires a downlink transmit power below a third transmit power threshold;

wherein the coverage areas adjacent to the coverage area of the at least one user device comprise the other sectors of the sectored-cell of which the sector serving the at least one user device is a part;

transmitting, by a transmitter, primary control channel information via a primary downlink control channel to the plurality of user devices, wherein the primary control channel information comprises an indication that the first OFDMA resource region in the secondary downlink control channel is assigned to the at least one user device;

transmitting, by the transmitter, secondary control channel information to the at least one user device in the first OFDMA resource region, wherein the secondary control channel information comprises uplink scheduling information.

2. The method of claim 1, wherein transmitting primary control channel information comprises transmitting primary control channel information in a first portion of a transmit frame with pilot information.

3. The method of claim 1, wherein transmitting primary control channel information comprises
transmitting primary control channel information via an OFDMA control region of a plurality of OFDMA control regions, wherein each control region of the plurality of OFDMA control regions occupy at least one from the group consisting of
a different set of frequency sub-carriers and
a different set of OFDMA symbols.

4. The method of claim 3, further comprising
transmitting primary control channel information to a second plurality of user devices via a second OFDMA control region of the plurality of OFDMA control regions.

5. The method of claim 3, wherein each control region of the plurality of OFDMA control regions occupy a set of frequency sub-carriers that are not being used for the transmission of primary control channel information by at least one other transmitter having an adjacent coverage area.

6. The method of claim 5,
wherein the plurality of user devices are served by a transmitter of a sector of a cell and
wherein the at least one other transmitter having an adjacent coverage area comprises a transmitter of another sector of the cell.

7. The method of claim 1, wherein transmit diversity is applied in transmitting at least one from the group consisting of the primary control channel information and the secondary control channel information.

8. The method of claim 7, wherein the transmit diversity applied is of a type from the group consisting of
STBC (Space-Time Block Code),
SFBC (Space-Frequency Block Code), and
CSD (cyclic shift diversity).

9. The method of claim 1,
wherein transmitting the primary control channel information comprises applying a sector-specific scrambling code as part of generating a transmit signal and
wherein transmitting the secondary control channel information comprises applying a sector-specific scrambling code as part of generating a transmit signal.

10. The method of claim 1,
wherein the primary control channel information comprises information required by the at least one user device to locate and decode at least a first portion of the secondary control channel information.

11. The method of claim 10,
wherein the secondary control channel information comprises information in addition to that included in the primary control channel information, which is required by the at least one user device to decode at least a second portion of the secondary control channel information.

12. The method of claim 1, wherein the primary control channel information comprises at least some information from the group of control information concerning
an OFDMA resource region assignment,
a modulation specifier for the OFDMA resource region, and
a user equipment (UE) identifier.

13. The method of claim 1, wherein the secondary control channel information comprises at least some information from the group of control information concerning
an OFDMA resource region assignment,
an indication of whether the OFDMA resource region assignment is distributed or localized,
smart antenna information,
a modulation specifier,
power control information, and
timing advance information.

14. The method of claim 1, wherein assigning the first OFDMA resource region to the at least one user device further comprises
assigning the first OFDMA resource region to the at least one user device when
the first OFDMA resource region has not been assigned to any user devices in coverage areas adjacent to the coverage area of the at least one user device.

15. The method of claim 14, wherein the coverage areas adjacent to the coverage area of the at least one user device comprise the other sectors of the sectored-cell of which the sector serving the at least one user device is a part.

16. The method of claim 1, wherein repetition coding is used in transmitting at least one from the group consisting of the primary control channel information and the secondary control channel information.

17. The method of claim 16, wherein the repetition coding used involves a repetition factor selected from the group consisting of 2, 4, 6 and 8.

18. A method for receiving control channel information comprising:
receiving, by a receiver, primary control channel information via an OFDMA (orthogonal frequency division multiple access) primary downlink control channel, wherein the primary control channel information comprises an indication that a first OFDMA resource region in an OFDMA secondary downlink control channel is assigned to at least one user device when at least one condition is met from the group consisting of:
the first OFDMA resource region has not been assigned to any user devices in coverage areas adjacent to the coverage area of the at least one user device that require a downlink transmit power above a first transmit power threshold,
the first OFDMA resource region has been assigned to at least one other user device in at least one coverage area adjacent to the coverage area of the at least one user device but the at least one user device only requires a downlink transmit power below a second transmit power threshold,
and the first OFDMA resource region corresponds to an OFDMA control region in at least one coverage area adjacent to the coverage area of the at least one user device but the at least one user device only requires a downlink transmit power below a third transmit power threshold, wherein the coverage areas adjacent to the coverage area of the at least one user device comprise the other sectors of the sectored-cell of which the sector serving the at least one user device is a part;

receiving, by the receiver, secondary control channel information via the first OFDMA resource region in response to receiving the indication that the first OFDMA resource region is assigned to the at least one user device, wherein the secondary control channel information comprises uplink scheduling information.

19. The method of claim 18, wherein the secondary control channel information comprises at least some information from the group of control information concerning
an OFDMA resource region assignment,
an indication of whether the OFDMA resource region assignment is distributed or localized,
smart antenna information,
a modulation specifier,
power control information, and
timing advance information.

20. A communication device comprising:
a transmitter;
a processing unit, communicatively coupled to the transmitter,
for assigning a first OFDMA (orthogonal frequency division multiple access) resource region in a secondary downlink control channel to at least one user device of a plurality of user devices when at least one condition is met from the group consisting of:
the first OFDMA resource region has not been assigned to any user devices in coverage areas adjacent to the coverage area of the at least one user device that require a downlink transmit power above a first transmit power threshold,
the first OFDMA resource region has been assigned to at least one other user device in at least one coverage area adjacent to the coverage area of the at least one user device but the at least one user device only requires a downlink transmit power below a second transmit power threshold,
and the first OFDMA resource region corresponds to an OFDMA control region in at least one coverage area adjacent to the coverage area of the at least one user device but the at least one user device only requires a downlink transmit power below a third transmit power threshold;
wherein the coverage areas adjacent to the coverage area of the at least one user device comprise the other sectors of the sectored-cell of which the sector serving the at least one user device is a part;
for transmitting, via the transmitter, primary control channel information via a primary downlink control channel to the plurality of user devices, wherein the primary control channel information comprises an indication that the first OFDMA resource region in the secondary downlink control channel is assigned to the at least one user device, and
for transmitting, via the transmitter, secondary control channel information to the at least one user device in the first OFDMA resource region, wherein the secondary control channel information comprises uplink scheduling information.

21. The communication device of claim 20, wherein the secondary control channel information comprises at least some information from the group of control information concerning
an OFDMA resource region assignment,
an indication of whether the OFDMA resource region assignment is distributed or localized,
smart antenna information,
a modulation specifier,
power control information, and
timing advance information.

22. A communication device comprising:
a receiver;
a processing unit, communicatively coupled to the receiver,
for receiving, via an OFDMA (orthogonal frequency division multiple access) primary downlink control channel signal received by the receiver, primary control channel information, wherein the primary control channel information comprises an indication that a first OFDMA resource region in a secondary downlink control channel is assigned to the communication device when at least one condition is met from the group consisting of:
the first OFDMA resource region has not been assigned to any user devices in coverage areas adjacent to the coverage area of the at least one user device that require a downlink transmit power above a first transmit power threshold;
the first OFDMA resource region has been assigned to at least one other user device in at least one coverage area adjacent to the coverage area of the at least one user device but the at least one user device only requires a downlink transmit power below a second transmit power threshold,
and the first OFDMA resource region corresponds to an OFDMA control region in at least one coverage area adjacent to the coverage area of the at least one user device but the at least one user device only requires a downlink transmit power below a third transmit power threshold,
wherein the coverage areas adjacent to the coverage area of the at least one user device comprise the other sectors of the sectored-cell of which the sector serving the at least one user device is a part; and
for receiving, via the receiver, secondary control channel information in the first OFDMA resource region in response to receiving the indication that the first OFDMA resource region is assigned to the communication device, wherein the secondary control channel information comprises uplink scheduling information.

23. The communication device of claim 22, wherein the secondary control channel information comprises at least some information from the group of control information concerning
an OFDMA resource region assignment,
an indication of whether the OFDMA resource region assignment is distributed or localized,
smart antenna information,
a modulation specifier,
power control information, and
timing advance information.

* * * * *